United States Patent [19]

Yoshida

[11] Patent Number: 4,556,240
[45] Date of Patent: Dec. 3, 1985

[54] CORROSION-RESISTANT, DOUBLE-WALL PIPE STRUCTURES

[75] Inventor: Toshio Yoshida, Kobe, Japan

[73] Assignee: Kawasaki Jukogyo Kabushiki Kaisha, Hyogo, Japan

[21] Appl. No.: 403,114

[22] Filed: Jul. 29, 1982

[30] Foreign Application Priority Data

Jul. 29, 1981 [JP] Japan .................... 56-117672

[51] Int. Cl.⁴ ............................ F16L 9/14
[52] U.S. Cl. ..................... 285/55; 285/189;
   285/286; 285/416; 285/334; 228/263.13
[58] Field of Search ............. 285/286, 55, 189, 334,
   285/416; 228/178, 187, 189, 263.13, 263.15

[56] References Cited

U.S. PATENT DOCUMENTS

| | | | |
|---|---|---|---|
| 2,136,474 | 11/1938 | Straty | 285/286 X |
| 2,209,290 | 7/1940 | Watts | 285/286 X |
| 2,308,307 | 1/1943 | Robinson | 285/286 X |
| 3,336,054 | 8/1967 | Blount et al. | 285/55 |

FOREIGN PATENT DOCUMENTS

| | | | |
|---|---|---|---|
| 11754 | 5/1969 | Japan | 285/55 |
| 369336 | 2/1973 | U.S.S.R. | 285/286 |

OTHER PUBLICATIONS

Welding Structures of Hastelloy Alloys, J. A. Gallaher, The Welding Journal, pp. 641–649; Jul. 1945.
Special Features of the Welding of Nickel to Mild and Stainless Steels, G. S. Kuzmin et al., Automatic Welding, vol. 23, N. 9, 9/1970.
Compilation of Trade Names, Specifications, and Producers of Stainless Alloys and Super Alloys, pp. 91, 111.
High Performance Alloy Specialists, Cabot Corporation, 2 pages.

Primary Examiner—Dave W. Arola
Attorney, Agent, or Firm—Wenderoth, Lind & Ponack

[57] ABSTRACT

In a corrosion-resistant, double-wall pipe structure formed by tightly fitting a stainless-steel inner pipe in an outer pipe, the inner pipe at any portion thereof which is liable to be adversely affected by heat due to heat processing is replaced by an inner tube of a special metal having corrosion resistance which is not easily impaired by the heat, the inner tube being joined integrally to the remainder portion of the inner pipe of the stainless steel. Examples of the special metal are Inconel 625, Incoloy 825, and Hastelloy.

6 Claims, 15 Drawing Figures

1

CORROSION-RESISTANT, DOUBLE-WALL PIPE STRUCTURES

BACKGROUND OF THE INVENTION

This invention relates generally to corrosion-resistant, multiple-wall pipe structures and more particularly to a technique for preventing deterioration of the corrosion resistance of parts undergoing heat processing of corrosion-resistant, multiple-wall pipe structures for use as oil flowline pipes and the like.

The type of corrosion-resistant, multiple-wall pipe (hereinafter referred to as a double-wall pipe) with which this invention is concerned is that comprising an outer pipe and a corrosion-resistant inner pipe tightly fitted in the outer pipe by a method such as a thermohydraulic fit method, the inner pipe being made of a material such as austenitic stainless steel, an example of this type of double-wall pipes being disclosed in U.S. Pat. No. 4,332,073 to Yoshida et al.

As is known, pipes possessing corrosion resistance together with strength and heat resistance are used for oilfield pipes and the like. Principally, a metal such as carbon steel is being used for strength, while a metal such as stainless steel is being used for resistance to corrosion. However, for the purpose of satisfying a requirement for such performances, composite multiple-wall pipes or double-wall pipes formed by laminately joining pipes of these two metals are being used.

Piping requiring the above mentioned performances are assembled by using such double-wall pipes with appropriate couplings, joints, fittings, branch pipes, etc., of double-wall construction. For reasons such as good sealing, rapidity of work, and facility of the assembly operation, joints such as butt-welded joints are often used.

More specifically, in the case of double-wall pipes each comprising an outer pipe made of carbon steel and a stainless-steel lining fitted against the inner wall surface of the outer pipe, a plurality of these pipes are butt welded end-to-end to form a long double-wall pipe. However, because of the great quantity of heat input through this butt welding, problems such as corrosion of the pipes due to lowered corrosion resistance of the stainless-steel lining at the welded ends arises.

When heat is applied to the stainless-steel lining to carry out the butt welding, chromium carbide is precipitated in the lining, based on the same principle as the "sensitizing treatment", and inter-granular corrosion arises, while, as a result of the heat applied, residual tensile stress is created in the lining, causing stress corrosion cracking.

As a counter measure against the stress corrosion cracking, it has been a common practice to cool the stainless-steel lining internally while the butt welding is being carried out and/or to hydraulically expand the lining locally after the welding has been carried out, and by carrying out these procedures it has been possible to obviate the problem. However, there has been no counter measure for the intergranular corrosion because the solution treatment to cause the precipitated chromium carbide to disappear after the welding cannot be carried out for the reason that part of the lining, adjoining the lining part subjected to the solution treatment, is necessarily heated to a sensitizing temperature range in which chromium carbide is precipitated.

SUMMARY OF THE INVENTION

It is an object of this invention to overcome the above described problems accompanying heat working of double-wall pipes based on the prior art and to provide double-wall pipe structures in which the inner lining part of those parts thereof which are apt to be adversely affected by heat processing, such as welding together of lengths of double-wall pipes, welding of a branch pipe to a double-wall pipe, or heat input from some other sources, are made in the form of an inner tube of a special high-performance metal whose corrosion resistance is not easily impaired by the heat of such heat processing.

Examples of such special metals are Inconel 625 (Trade name of a nickel base superalloy produced by Cabot Corporation of U.S.A.), Incoloy 825 (Trade name of an iron base superalloy produced by Cabot Corporation), and Hastelloy (Trade name of a nickel base superalloys produced by Cabot Corporation). The inner tube made of such an alloy is welded to the remainder or general part of the inner pipe made of a metal such as austenitic stainless steel before the inner pipe is fitted in the outer pipe to form the double-wall pipe structure. After an inner pipe has been thus assembled, those parts thereof which have been heat affected are subjected to solution heat treatment, cooling, etc., to remove the effects of heat and to restore the anticorrosion property of the parts. Then, with the inner pipe in this state, it is fitted tightly into the outer pipe to form a double-wall pipe structure by a known process.

A double-wall pipe structure according to this invention thus fabricated can be subjected to the intended heat processing such as welding without any variation whatsoever in the anticorrosion characteristic of the inner pipe throughout its entire length.

The nature, utility, and further features of this invention will be more clearly apparent from the following detailed description with respect to examples of preferred embodiments of the invention when read in conjunction with the accompanying drawings, briefly described below.

DETAILED DESCRIPTION OF THE INVENTION

Figure 12:
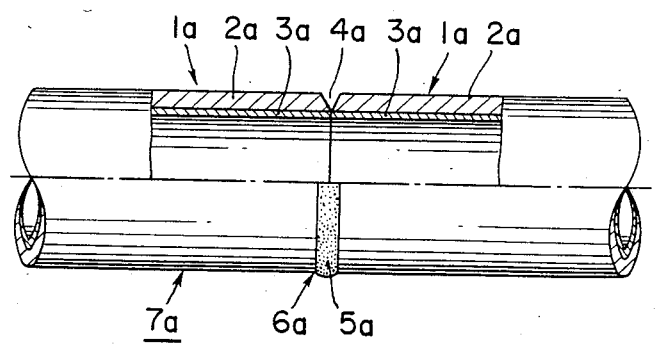
FIG. 12 is a side view, similar to FIG. 3, indicating the manner in which the ends of two conventional double-wall pipes are welded together.

As conducive to a full understanding of this invention, the general nature and limitations of a known corrosion-resistant, double-wall pipe structure will first be briefly described with reference to FIG. 12.

This double-wall pipe structure 1a comprises an outer pipe 2a made of carbon steel and an inner lining 3a made of a stainless steel and tightly fitted against the inner wall surface of the outer pipe 2a. A plurality of unit lengths of this pipe structure 1a are beveled at their ends as at 4a and butt welded at 5a end-to-end so as to form a welded joint 6a and to produce a long corrosion-resistant, double-wall pipe 7a.

However, because of the great quantity of heat applied for this butt welding, as mentioned hereinbefore, the anti-corrosion property of the stainless steel lining 3a at the ends of the pipe structures 1a is impaired by this welding heat, whereby an unbalance between the anticorrosion property of the pipe ends and that of the remaining or general parts of the pipes develops, and corrosion occurs during use.

The manner in which these problems are solved in accordance with this invention will now be described with respect to preferred embodiments thereof with reference to FIGS. 1 through 11. In these figures, those parts which are the same as or equivalent to corresponding parts in FIG. 12 are designated by like reference numerals.

Figure 1:
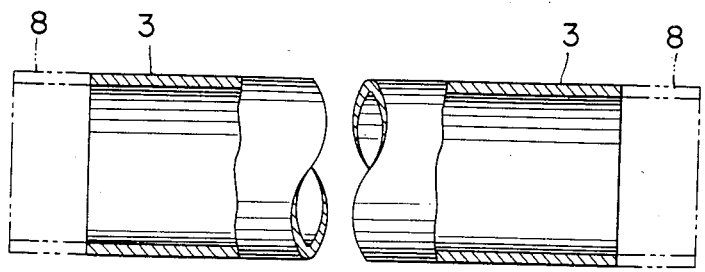
FIG. 1 is a side view, with a part shown in longitudinal section and a part cut away for foreshortening, of an ordinary inner pipe.
Figure 3:
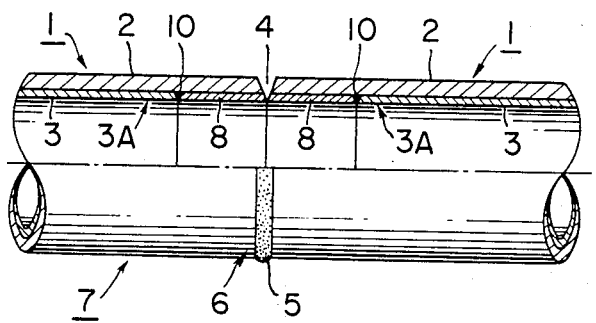
FIG. 3 is a similar side view indicating the manner in which the ends of two double-wall pipe structures of the invention formed with the inner pipes shown in FIG. 2 are welded together.

As described hereinbefore and shown in FIG. 3, a corrosion-resistant, double-wall pipe structure 1 comprises an outer pipe 2 made of carbon steel and an inner pipe 3 made of stainless steel and constituting an inner lining of the outer pipe. According to this invention, tubes (for example, made of stainless steel, designation SUS 316L of the Japanese Industrial Standards (JIS)) to become the inner pipe 3 are prepared beforehand as shown in FIG. 1, and, to the opposite ends of each tube 3, respective end inner tubes 8 of a special alloy such as, for example, Inconel 625 (Trade name of a nickel base alloy produced by Cabot Corporation of U.S.A.), Incoloy 825 (Trade name of an iron base alloy produced by Cabot Corporation), or Hastelloy (trade name of a nickel base alloys produced by Cabot Corporation) are joined as shown in chain line. The length of each of these end inner tubes 8 is made slightly longer than the length of the region of the double-wall pipe structure influenced by heat at the time of butt welding as described hereinbefore.

Figure 2:
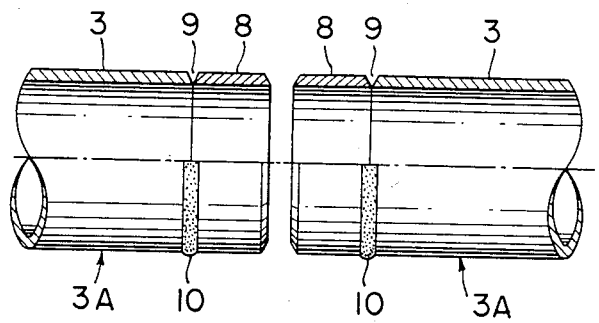
FIG. 2 is a similar side view indicating the manner in which end inner, tubes of special metals of high corrosion resistance are welded to the ends of general parts of inner pipes.

For joining each end inner tube 8 to the inner pipe 3, beveled parts 9 for butt welding are formed on the mating ends of the tube and inner pipe as shown in FIG. 2. Then a butt weld 10 is made to integrally join the tube and pipe. When the end inner tubes 8 have been thus welded to the ends of each inner pipe 3, a composite inner pipe 3A is obtained. When a butt weld 10 is made in this manner, the welding heat has an influence on the end portion of the inner pipe 3 butt welded to the end inner tube 8, whereby the original anticorrosion property of the inner pipe 3 is impaired in this end portion thus influenced. Accordingly, depending on the necessity, each end portion thus influenced by heat is subjected to solution heat treatment, and/or residual stress removal, thereby to remove the effect of the welding heat and restore the properties of the pipe 3 as an inner pipe.

Then, finally, the beads at the butt welds 10 are leveled and made to be flush with the outer surface of the composite inner pipe 3A by a process such as grinding.

Then, by a method such as, for exmaple, the thermohydraulic fit method disclosed and claimed in U.S. Pat. No. 4,332,073 to Yoshida et al, the corrosion-resistant, double-wall pipe structure 1 comprising tightly fitted inner and outer pipes as shown in FIG. 3 is obtained by inserting each composite inner pipe 3A thus prepared and reduced in diameter by cooling to a temperature of the order, for example, of that of city tap water into a carbon-steel outer pipe 2 of corresponding length which has been heated and increased in diameter, causing the composite inner pipe 3A in suitably sealed state to be hydraulically expanded with water to contact the outer pipe 2, continuing the pipe expansion until a specific diameter is reached, then removing the pipe-expanding pressure, causing the pipes to assume the ambient temperature, and permitting the outer pipe to decrease in diameter to establish an interference fit.

A plurality of unit lengths of double-wall pipe structures 1 thus fabricated are joined end-to-end by forming beveled ends 4 for butt welding at their ends and butt welding adjacent pipe structures as at 5 thereby to obtain welded joints 6 and thereby to form a corrosion-resistant, double-wall pipe 7 of long length. (For convenience in illustration, only one pair of unit lengths of double-wall pipe structures 1 is shown in FIG. 3.)

In this welding process, heat due to welding is transmitted into the regions of the pipe structures in the vicinity of the joint. However, the regions of the inner lining influenced by this heat are constituted by the end inner tubes 8 of a special high-performance alloy such as Inconel 625, the high corrosion resistance of which is not readily impaired by the welding heat, or, even if it deteriorates somewhat, this special alloy still possesses corrosion resistance equivalent to that of the general part 3 of the inner pipe structure 3A, i.e., the part thereof other than the end parts. The anticorrosion function of the composite inner pipe 3A as a lining is therefore preserved, and the corrosion resistance of the entire inner pipe 3A is maintained.

The above described embodiment of this invention illustrates one mode of practice thereof wherein a plurality of unit lengths of corrosion-resistant, double-wall pipe structure are joined end-to-end by butt welding.

Figure 4A:
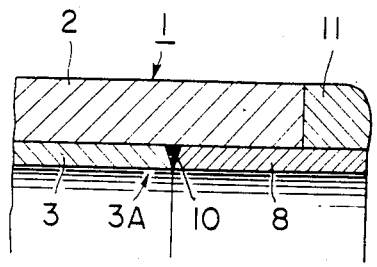
FIGS. 4a and 4b are relatively enlarged, fragmentary side sectional views indicating the forming of tapered screw threads on an end of a double-wall pipe structure of the invention by weld padding and machining.
Figure 4B:
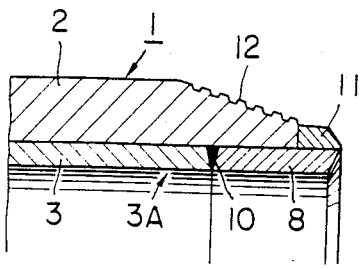

In another embodiment of the invention, as shown in FIGS. 4a and 4b, an end inner tube 8 is butt welded as at 10 to each end of a general inner pipe 3 similarly as in the preceding embodiment, and, after the resulting composite inner pipe 3A structure has been fitted tightly in an outer pipe 2, an end part of the outer pipe 2 is cut away. Then, on and around the end part of the inner tube 8 thus exposed, an annular filling 11 is deposited by overlay welding as shown in FIG. 4a. Then, as shown in FIG. 4b, tapered screw threads 12 for a coupling joint are formed on the end of the pipe. In this case, also, heat due to the overlay welding to form filling 11 cannot influence the general part 3 of the composite inner pipe 3A to an extent to impair its anticorrosion property.

Figure 5A:
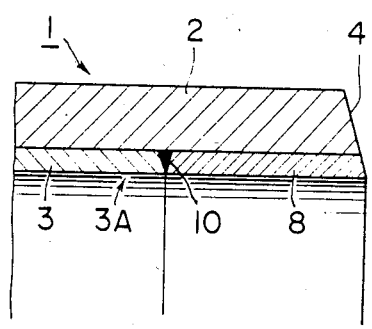
FIGS. 5a and 5b are relatively enlarged, fragmentary side sectional views indicating the manner in which a flange is welded onto an end of a double-wall pipe structure of the invention.
Figure 5B:
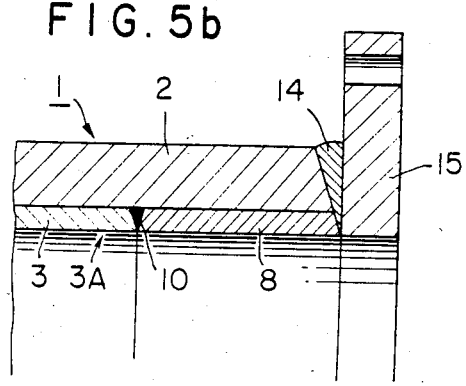

In another embodiment of the invention as illustrated in FIGS. 5a and 5b, a double-wall pipe structure 1 is fabricated according to the invention, and a beveled scarf 4 is formed at an end thereof as shown in FIG. 5a. Thereafter, as shown in FIG. 5b, this pipe end is butt welded as at 14 to a flange 15 formed separately by using a special corrosion-resistant material such as Inconel 625. In this case, also, the heat applied for the welding has no adverse effect whatsoever in impairing the corrosion resistance of the general part 3 and end tube 8 of the composite inner pipe 3A.

Figure 6A:
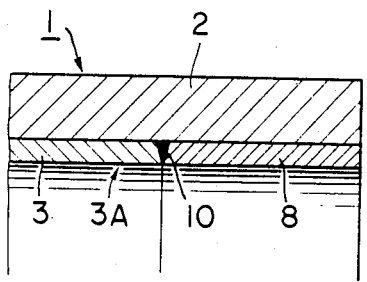
FIGS. 6a and 6b are relatively enlarged, fragmentary side sectional views indicating the manner in which a corrosion preventing weld is providedd at the interface between the outer pipe and the inner tube at an end face thereof.
Figure 6B:
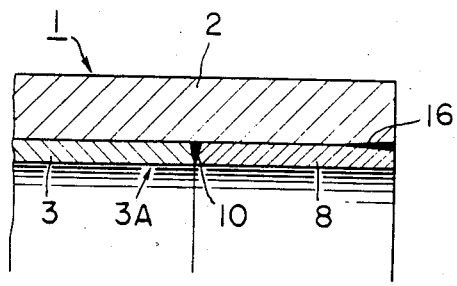

Unit lengths of the double-wall pipe structure fabricated as described above are immediately joined by any of various joining methods into a double-wall pipe of long length in many cases, but in some cases, for reasons such as transportation and storage, these unit lengths of pipe structure are stored or stock piled in the field in an oxidizing corrosive environment. When there is such a possibility, corrosion-resistant, double-wall pipe structure 1 is fabricated as shown in FIG. 6a, and, at the outer part of the interface between the outer pipe 2 and the end inner tube 8 of each end of each double-wall pipe structure 1, welding as at 16 is carried out as indicated in FIG. 6b. In this case, also, the heat of this welding has almost no effect on the anticorrosion property of the general part of the composite inner pipe 3A.

Figure 7:
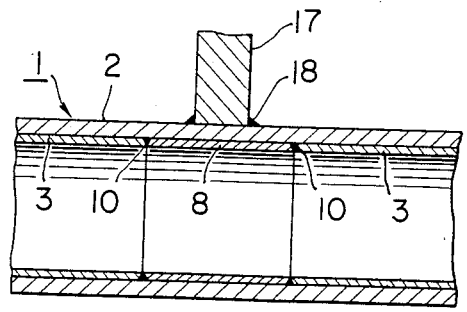
FIG. 7 is a side view in longitudinal section showing the securing of a bracket to the outer surface of a double-wall pipe of the invention.

In still another embodiment of the invention as shown in FIG. 7, a bracket 17 is fixedly secured by welding at 18 to the outer surface of a corrosion-resistant, double-wall pipe structure 1 of the invention. In this case, the portion of the inner pipe 3 whose corrosion resistance may be impaired by the heat of this welding process is replaced by a tube 8 of high corrosion resistance such as Inconel 625, which is secured in the manner described hereinbefore to the adjacent portions of the inner pipes 3. Accordingly, deterioration of the anticorrosion property of the double-wall pipe structure 1 is effectively prevented similarly as in the preceding embodiments.

Figure 8:
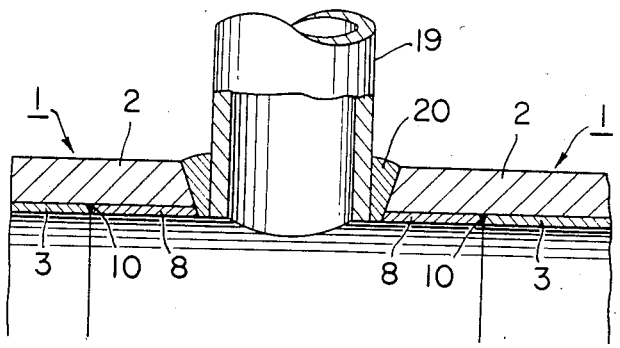
FIG. 8 is a relatively enlarged, fragmentary side view, mostly in longitudinal section, of a branch pipe connected by welding to a double-wall pipe structure of the invention.

In another embodiment of the invention as illustrated in FIG. 8, a single-wall pipe 19 of corrosion-resistant material such as Inconel 625 is connected as a branch pipe by welding as at 20 to a double-wall pipe structure 1 of the invention to form a Tee joint. In this case, also, the portion of the inner pipe 3 of the double-wall pipe structure 1 in the vicinity of the weld 20 is replaced by an inner tube 8 of a material of high corrosion resistance such as Incoloy 825, which is secured at 10 integrally to the general part 3 of the inner pipe in the manner described hereinbefore. Thus, deterioration of the anticorrosion property of the general part 3 of the inner pipe due to the welding at 20 is prevented.

Figure 9:
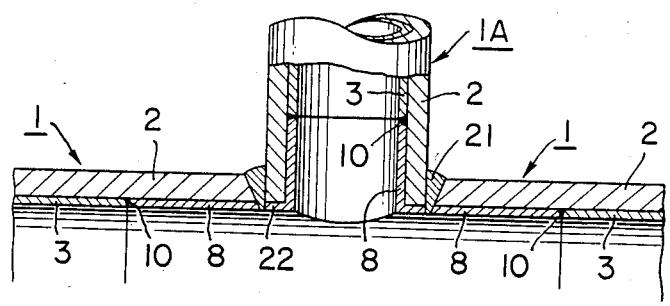
FIG. 9 is a side view, similar to FIG. 8, showing a double-wall pipe structure of the invention connected as a branch pipe by welding to another double-wall pipe structure of the invention.

In a further embodiment of this invention as shown in FIG. 9, a corrosion-resistant, double-wall pipe structure 1A of the invention is connected as a branch pipe by welding as at 21 to a corrosion-resistant, double-wall pipe structure 1 of the invention to form a Tee joint. In this case, the portions of the inner pipes 3 of both double-wall pipe structures 1 and 1A in the vicinity of the weld 20 are replaced by respective inner tubes 8 of a material of high corrosion resistance such as Incoloy 825, which are secured integrally to the general parts 3 of the inner pipes as described hereinbefore. The end tube 8 of the pipe structure 1A is extended to the end surface of the outer pipe 2 as indicated at 22 for protection of the outer pipe. The anticorrosion property of these general parts 3 of the inner pipes of the two double-wall pipes structures 1 and 1A are thereby protected against deterioration due to the heat of the welding at 21.

Figure 10:
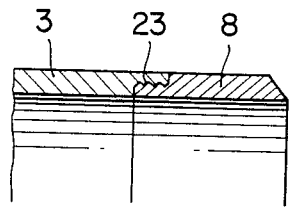
FIGS. 10 and 11 are relatively enlarged, fragmentary side sectional views respectively indicating methods other than welding of joining an end inner tube to the end of a general part of an inner pipe.
Figure 11:
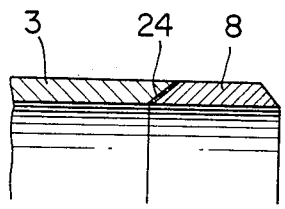

The method of joining the inner tube 8 of a material of high corrosion resistance, such as Inconel 625, integrally to the inner pipe need not be limited to welding as in the above described examples though welding is most desirable. Alternative methods are, for example, joining by means of screw threads 23 as indicated in FIG. 10 and bonding by means of an adhesive 24 as indicated in FIG. 11.

The modes of practicing this invention are not limited, of course, to those described above with respect to certain embodiments. For example, it is possible to apply the invention to cases wherein the heat processing is other than welding. Furthermore, the inner pipe can be fabricated by butt welding a material of high corrosion resistance as mentioned above in flat-plate form to a general inner tube material in flat-plate form, suitably forming the plate material thus welded into tubular form, and, when necessary, carrying out various processes such as solution heat treatment. For the material of the above mentioned general part of the inner pipe, it is possible to use, other than austenitic stainless steel, some other uniform metal. For the above mentioned special high-performance metal, it is possible, of course, to use a uniform metal in addition to Inconel 625, Incoloy 825, and Hastelloy.

According to this invention as described above, there is provided a corrosion-resistant, double-wall pipe structure comprising an outer pipe and a corrosion-resistant inner pipe tightly fitted in the outer pipe, in which the inner pipe at parts thereof which are apt to be adversely affected by heat when the double-wall pipe structure is subjected to welding or some other heat processing is in the form of an inner tube of special metal of relatively high resistance to corrosion, heat, abrasion, etc., which inner tube has been butt welded beforehand to the general part of the inner pipe made of a metal such as austenitic stainless steel. Because of this construction, heat due to welding or some other heating process carried out on the double-wall pipe structure of this invention cannot impair the anticorrosion property of the inner pipe.

Furthermore, the heat applied during the butt welding of the inner tube of special metal to the general part of the inner pipe may adversely affect the anticorrosion property of that portion of the general part of the inner pipe near the butt weld. In such a case the corrosion resistance and other affected properties of said portion can be restored by treatment such as solution heat treatment or removal of residual stress. The anticorrosion function of the inner pipe of the double-wall pipe structure of the invention can thus be preserved unchanged throughout the entire pipe or assembly of a plurality of unit pipe lengths.

Since the length in the pipe longitudinal direction of the inner tubes of the above mentioned special metal is very short relative to the length of the general part of the inner pipe made of stainless steel, the additional material cost is not prohibitive. Moreover, the step of welding the end inner tube to the inner pipe is simple. Additional costs due to such additional work may well be compensated for by the corrosion resistance afforded by this invention and by the capability of carrying out the solution treatment after the heat processing.

What is claimed is:

1. A corrosion-resistant double-wall pipe structure formed by interference-fitting a corrosion-resistant inner pipe in an outer pipe, said inner pipe, at a portion thereof which is liable to be adversely affected by heat due to heat processing to the pipe structure, being constituted by an inner tube of a nickel-base superalloy having corrosion resistance which is not easily imparied by said heat, said inner tube being joined integrally to the remaining, general portion of said inner pipe which is made of stainless steel, said inner tube being provided at an end of the pipe structure, the extreme end part of said outer pipe, at the end of said pipe structure provided with said inner tube, being replaced by an annular filling formed by overlay welding a corrosion-resistant metal around the end part of said inner tube and to the end face of said outer pipe, and tapered screw threads for screwing into a pipe coupling formed on the end portion of the pipe structure.

2. A corrosion-resistant double-wall pipe structure formed by interference-fitting a corrosion-resistant inner pipe in an outer pipe, said inner pipe, at a portion thereof which is liable to be adversely affected by heat due to heat processing to the pipe structure, being constituted by an inner tube of a nickel-base superalloy having corrosion resistance which is not easily impaired by said heat, said inner tube being joined integrally to the remaining, general portion of said inner pipe which is made of stainless steel, said inner tube being provided at an end of the pipe structure, and, at the end face of the end of said pipe structure provided with said inner tube, a sealing weld provided in the interface between said inner tube and said outer tube thereby to prevent corrosion at said interface.

3. A corrosion-resistant double-wall pipe structure formed by interference-fitting a corrosion-resistant inner pipe in an outer pipe, said inner pipe, at a portion thereof which is liable to be adversely affected by heat due to heat processing to the pipe structure, being constituted by an inner tube of a nickel-base superalloy having corrosion resistance which is not easily impaired by said heat, said inner tube being joined integrally to the remaining, general portion of said inner pipe which is made of stainless steel, said inner tube being provided at a position intermediate between the ends of said pipe structure, and a branch pipe to be connected at one end thereof by welding to the pipe structure at said position thereof, said branch pipe comprising a double-wall pipe structure having an end provided with an inner tube connected by welding to the first named double-wall pipe structure.

4. A corrosion-resistant double-wall pipe structure formed by interference-fitting a corrosion-resistant inner pipe in an outer pipe, said inner pipe, at a portion thereof which is liable to be adversely affected by heat due to heat processing to the pipe structure, being constituted by an inner tube of an iron-base superallow having corrosion resistance which is not easily impaired by said heat, said inner tube being joined integrally to the remaining, general portion of said inner pipe which is made of stainless steel, said inner tube being provided at an end of the pipe structure, the extreme end part of said outer pipe, at the end of said pipe structure provided with said inner tube, being replaced by an annular filling formed by overlay welding a corrosion-resistant metal around the end part of said inner tube and to the end face of said outer pipe, and tapered screw threads for screwing into a pipe coupling formed on the end portion of the pipe structure.

5. A corrosion-resistant double-wall pipe structure formed by interference-fitting a corrosion-resistant inner pipe in an outer pipe, said inner pipe, at a portion thereof which is liable to be adversely affected by heat due to heat processing to the pipe structure, being constituted by an inner tube of an iron-base superalloy having corrosion resistance which is not easily impaired by said heat, said inner tube being joined integrally to the remaining, general portion of said inner pipe which is made of stainless steel, said inner tube being provided at an end of the pipe structure, and at the end face of the end of said pipe structure provided with said inner tube, a sealing weld provided in the interface between said inner tube and said outer pipe thereby to prevent corrosion at said interface.

6. A corrosion-resistant double-wall pipe structure formed by interference-fitting a corrosion-resistant inner pipe in an outer pipe, said inner pipe, at a portion thereof which is liable to be adversely affected by heat due to heat processing to the pipe structure, being constituted by an inner tube of an iron-base superalloy having corrosion resistance which is not easily impaired by said heat, said inner tube being joined integrally to the remaining, general portion of said inner pipe which is made of stainless steel, said inner tube being provided at a position intermediate between the ends of said pipe structure, and a branch pipe to be connected at one end thereof by welding to the pipe structure at said position thereof, said branch pipe comprising a double-wall pipe structure having an end provided with an inner tube connected by welding to the first named double-wall pipe structure.

* * * * *